(12) United States Patent
Morris et al.

(10) Patent No.: US 9,169,905 B1
(45) Date of Patent: Oct. 27, 2015

(54) DRIVE ASSEMBLY WITH OVERRIDE MECHANISM

(71) Applicants: Donald Morris, Littleton, CO (US); David Johnson, Modesto, CA (US); Benjamin Bonnett, Modesto, CA (US)

(72) Inventors: Donald Morris, Littleton, CO (US); David Johnson, Modesto, CA (US); Benjamin Bonnett, Modesto, CA (US)

(73) Assignee: Lift-U, Division of Hogan Mfg., Inc., Escalon, CA (US)

( * ) Notice: Subject to any disclaimer, the term of this patent is extended or adjusted under 35 U.S.C. 154(b) by 0 days.

(21) Appl. No.: 14/180,127

(22) Filed: Feb. 13, 2014

(51) Int. Cl.
 *F16H 21/44* (2006.01)

(52) U.S. Cl.
 CPC ..................................... *F16H 21/44* (2013.01)

(58) Field of Classification Search
 CPC ............. E05F 15/40; E05F 3/18; E05F 16/60; E05F 3/00; E05F 15/124; Y10T 74/1892; Y10T 74/18928; Y10T 74/18936; Y10T 74/18944; E05Y 2900/40; E05Y 2900/21; E05Y 2900/114; E05Y 2900/546; E05Y 2201/23; E05Y 2201/236; E05Y 2900/132; F16H 21/44; F16H 21/40; F16H 21/22; F16H 2025/2012; F16H 2025/2056; F16H 2025/2068; F16H 25/20; F16H 25/12
 USPC .............. 74/470, 102–106; 49/340, 339, 345; 16/49, 66, 68, 70, 65, 50, 71, 78, 80, 16/82, 84, 52, 62, 63, 64, 69; 292/144, 292/DIG. 61
 See application file for complete search history.

(56) References Cited

U.S. PATENT DOCUMENTS

| | | | | |
|---|---|---|---|---|
| 467,997 | A | * | 2/1892 | Schubert .......................... 16/70 |
| 842,121 | A | * | 1/1907 | Smith ............................... 16/63 |
| 893,185 | A | * | 7/1908 | Mick ................................ 16/70 |
| 979,190 | A | * | 12/1910 | Murphy ............................ 16/70 |
| 1,808,341 | A | * | 6/1931 | Burstein et al. ................... 16/70 |
| 2,044,509 | A | * | 6/1936 | Perkins ............................. 16/70 |
| 2,092,531 | A | * | 9/1937 | Dimick ............................ 16/84 |
| 2,122,327 | A | * | 6/1938 | Schwarz ........................... 16/50 |
| 2,622,778 | A | * | 12/1952 | Poland ............................ 141/73 |
| 2,717,797 | A | * | 9/1955 | Savage .......................... 292/332 |
| 2,783,492 | A | * | 3/1957 | Duncan ............................ 16/80 |
| 3,042,957 | A | * | 7/1962 | Muessel et al. .................. 16/62 |
| 3,043,566 | A | * | 7/1962 | Grise ............................. 74/89.2 |
| 3,045,276 | A | * | 7/1962 | Schwarz ........................... 16/79 |
| 3,168,854 | A | * | 2/1965 | Neilson .......................... 91/437 |
| 3,217,610 | A | * | 11/1965 | Roskin ............................ 92/25 |
| 3,252,170 | A | * | 5/1966 | Frye ................................ 5/697 |
| 3,254,699 | A | * | 6/1966 | Wanner ......................... 160/193 |
| 3,261,573 | A | * | 7/1966 | Roberts et al. ................ 244/225 |

(Continued)

*Primary Examiner* — William Kelleher
*Assistant Examiner* — Jude Agendia
(74) *Attorney, Agent, or Firm* — Christensen O'Connor Johnson Kindness PLLC (57) ABSTRACT

A disclosed drive assembly is suitable for driving an actuatable component in a first direction and a second direction. The drive assembly includes a housing and a drive rod. The drive rod selectively extends and retracts to apply a driving force to the actuatable component in a first and a second direction, respectively. The driving force creates a reactive force on the housing. An override assembly includes a spring in communication with the housing. The housing pushes a first end of the spring toward a second end of the spring when the reactive force exceeds a predetermined limit and the drive rod applies the driving force in the first direction. The housing pulls the second end of the spring toward the first end of the spring when the reactive force exceeds the predetermined limit and the drive rod applies the driving force in the second direction.

20 Claims, 11 Drawing Sheets

(56) References Cited

U.S. PATENT DOCUMENTS

| | | | |
|---|---|---|---|
| 3,339,839 A * | 9/1967 | Jensen et al. | 235/100 |
| 3,394,499 A * | 7/1968 | Korthaus et al. | 49/340 |
| 3,527,324 A * | 9/1970 | Butler et al. | 188/112 R |
| 3,604,404 A * | 9/1971 | Pitchford | 123/363 |
| 3,626,549 A * | 12/1971 | Jentsch | 6/53 |
| 3,887,961 A * | 6/1975 | Saajos | 16/56 |
| 3,991,661 A * | 11/1976 | Mocha | 92/131 |
| 4,003,102 A * | 1/1977 | Hawks et al. | 16/72 |
| 4,059,025 A * | 11/1977 | Waack et al. | 74/482 |
| 4,082,168 A * | 4/1978 | Cole et al. | 188/112 R |
| 4,115,897 A * | 9/1978 | Zunkel | 16/49 |
| 4,213,480 A * | 7/1980 | Orum et al. | 137/556 |
| 4,317,254 A * | 3/1982 | Chaddock | 16/61 |
| 4,335,624 A * | 6/1982 | Garman et al. | 74/482 |
| 4,369,545 A * | 1/1983 | Maublanc | 16/64 |
| 4,429,492 A * | 2/1984 | Imhoff | 49/367 |
| 4,483,044 A * | 11/1984 | Johnston et al. | 16/70 |
| 4,547,099 A * | 10/1985 | Alexandrov et al. | 406/149 |
| 4,649,598 A * | 3/1987 | Kinsey et al. | 16/81 |
| 4,650,151 A * | 3/1987 | McIntyre | 251/14 |
| 4,660,250 A * | 4/1987 | Tillman et al. | 16/58 |
| 4,756,204 A * | 7/1988 | Wittwer et al. | 74/469 |
| 4,779,909 A * | 10/1988 | Hennessy | 292/166 |
| 5,706,551 A * | 1/1998 | Jeynes et al. | 16/59 |
| 5,913,763 A * | 6/1999 | Beran et al. | 49/506 |
| 6,317,922 B1 * | 11/2001 | Kondratuk | 16/72 |
| 6,352,239 B1 * | 3/2002 | McIntosh et al. | 251/100 |
| 6,442,796 B2 * | 9/2002 | Arisaka et al. | 16/84 |
| 6,487,960 B1 * | 12/2002 | Chatufale | 92/165 R |
| 6,625,847 B1 * | 9/2003 | Jones | 16/51 |
| 6,681,525 B1 * | 1/2004 | Dudley | 49/358 |
| 6,880,610 B1 * | 4/2005 | Bush | 160/202 |
| 6,886,217 B2 * | 5/2005 | Foster | 16/69 |
| 7,024,725 B2 * | 4/2006 | Homberg | 16/79 |
| 7,066,455 B2 * | 6/2006 | Adoline et al. | 267/168 |
| 7,533,432 B2 * | 5/2009 | Morris et al. | 14/71.3 |
| 7,533,433 B2 | 5/2009 | Morris | |
| 7,533,434 B2 | 5/2009 | Morris | |
| 7,681,272 B2 | 3/2010 | Morris | |
| 8,307,495 B1 * | 11/2012 | Berkseth | 16/66 |
| 8,631,529 B1 * | 1/2014 | Johnson et al. | 14/71.3 |
| 2004/0205930 A1 * | 10/2004 | Huang | 16/64 |
| 2005/0273975 A1 * | 12/2005 | Foster | 16/51 |
| 2006/0021189 A1 * | 2/2006 | Johnson | 16/63 |
| 2007/0226954 A1 * | 10/2007 | Artsiely | 16/70 |
| 2008/0017455 A1 * | 1/2008 | Cohn et al. | 187/276 |
| 2009/0093913 A1 * | 4/2009 | Copeland et al. | 700/282 |
| 2009/0265992 A1 * | 10/2009 | Hass et al. | 49/340 |
| 2010/0236021 A1 * | 9/2010 | Sir Louis | 16/303 |
| 2015/0033501 A1 * | 2/2015 | Leone et al. | 16/82 |

* cited by examiner

DRIVE ASSEMBLY WITH OVERRIDE MECHANISM

BACKGROUND

Persons with physical impairments may find it difficult to open and close the door in various environments, such as, of example, the door to a courtroom witness box. Thus, people often depend on mechanical actuators to open and close doors. For such situations, a door having actuatable components that may be controlled from inside or outside of the witness box can assist a person entering or exiting the witness box.

The actuatable components of a witness box door must meet certain force requirements defined in the ANSI Code. Door actuators typically incorporate an override assembly having a control system that utilizes contact switches to sense obstructions encountered by the door components. Upon sensing an obstruction, the control system typically either shuts down the actuator, effectively stopping the components, or limits the force of the actuator by a current limit or pressure regulator. The override assembly may be either active or passive. An active override assembly uses powered controls to achieve force limits, and a passive type uses regulators to limit forces (such as hydraulic relief valves). An active assembly does not easily allow manual override, and passive systems can overheat.

It is desired to have a reliable override assembly that limits the force an actuator imposes on the actuatable components of the door without damaging the obstruction or the door components.

SUMMARY

A first exemplary embodiment of a disclosed drive assembly is suitable for driving an actuatable component in a first direction and a second direction. The drive assembly includes a housing and a drive rod. The drive rod selectively extends and retracts to apply a driving force to the actuatable component in a first and a second direction, respectively. The driving force creates a reactive force on the housing. An override assembly includes a spring in communication with the housing. The housing pushes a first end of the spring toward a second end of the spring when the reactive force exceeds a predetermined limit and the drive rod applies the driving force in the first direction. The housing pulls the second end of the spring toward the first end of the spring when the reactive force exceeds the predetermined limit and the drive rod applies the driving force in the second direction.

A second embodiment of a disclosed drive assembly selectively opens and closes a door. The drive assembly includes an actuator having a housing and a drive rod. The drive rod applies a driving force in a first direction to open the door and in a second direction to close the door. Application of the driving force creates a reactive force on the actuator. The drive assembly further includes an override assembly coupled to the actuator. The override assembly includes a first spring fitting, a second spring fitting, and a spring disposed between the first and second spring fittings. The first spring fitting moves toward the second spring fitting when the reactive force exceeds a predetermined limit and the actuator is applying the driving force in the first direction. The second spring fitting moves toward the first spring fitting when the reactive force exceeds the predetermined limit and the actuator is applying the driving force in the second direction.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
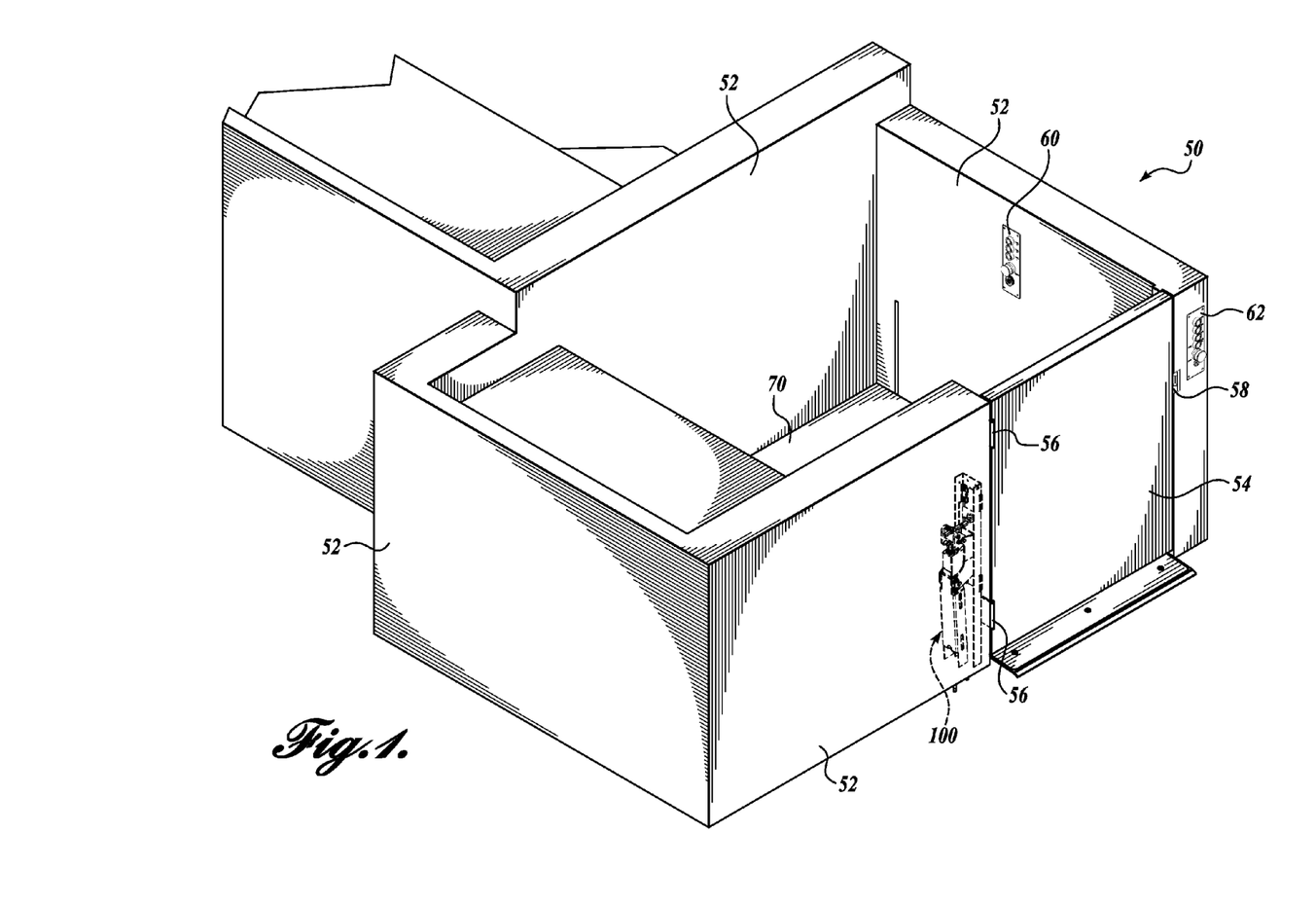
FIG. 1 is an isometric view of a witness box with a closed door, the witness box having an exemplary embodiment of a drive assembly for the door constructed in accordance with the present disclosure.
Figure 2:
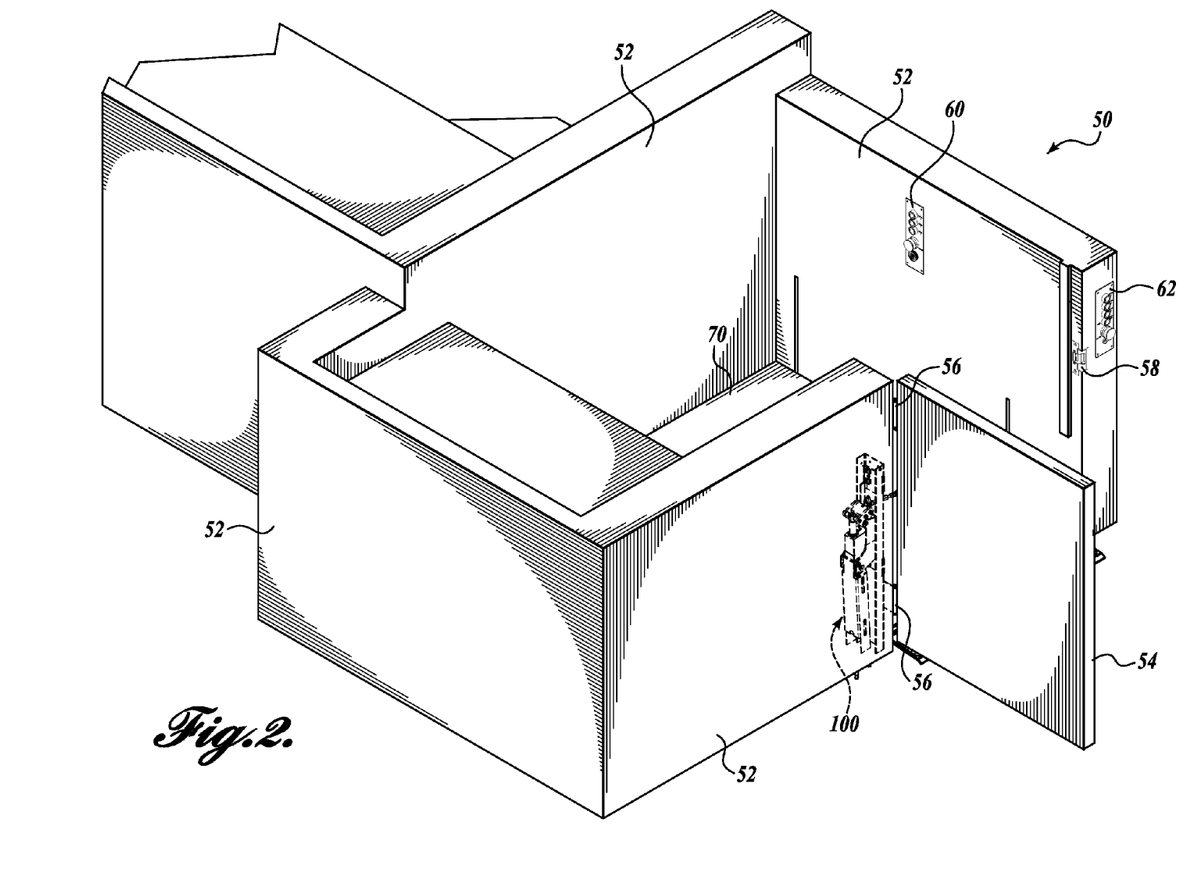
FIG. 2 is an isometric view of the witness box and drive assembly of FIG. 1 with the door open.
Figure 3:
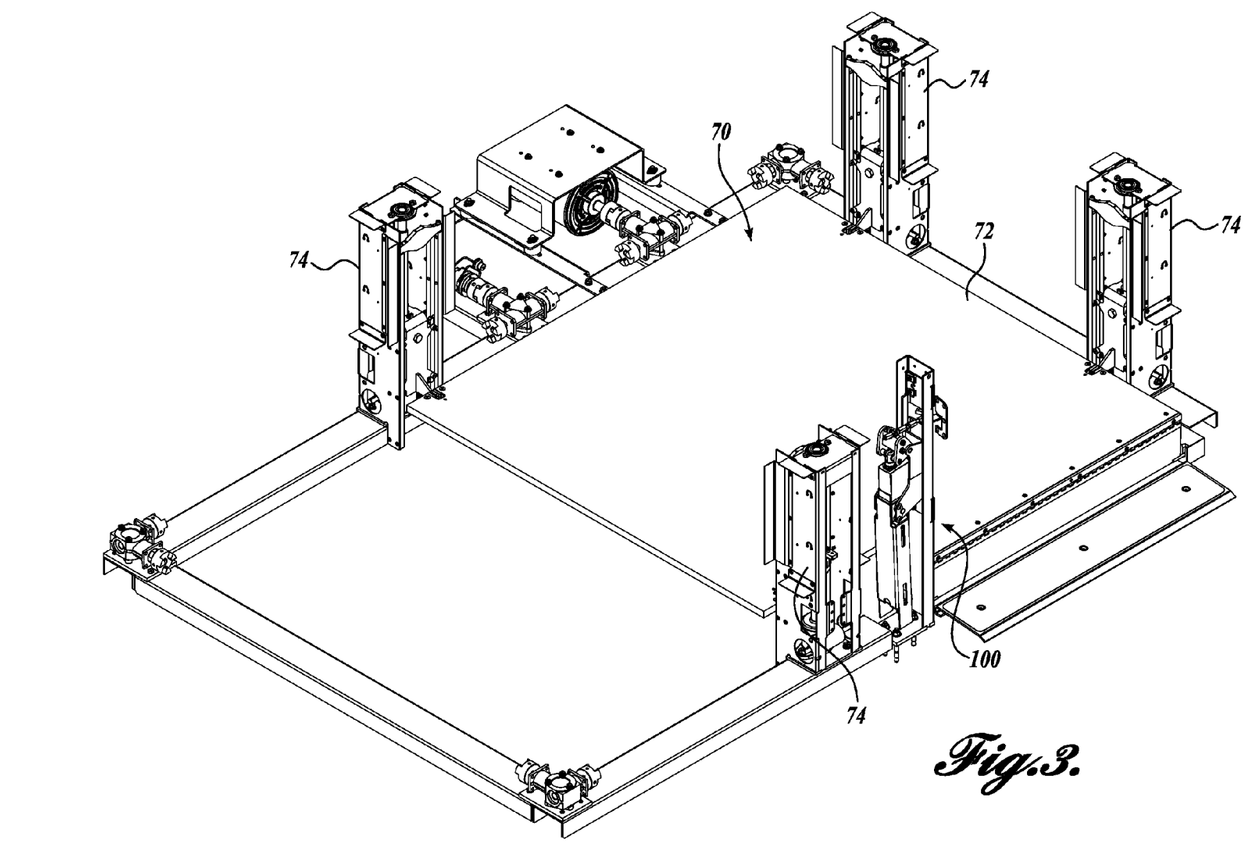
FIG. 3 is an isometric view of the drive assembly for the door and a platform lift of the witness box of FIG. 1.

Referring to FIGS. 1-3, one exemplary embodiment of the disclosed drive assembly 100 is shown utilized in a courtroom setting, and more specifically, to open and close the door 54 of a witness box 50. In the illustrated embodiment, the witness box 50 includes four walls 52 surrounding a witness area, with an opening for ingress and egress. A door 54 is mounted to one of the walls 52 by a pair of hinges 56 so that the door is rotatable between a closed position, shown in FIG. 1, and an open position, shown in FIG. 2. A latch 58 is positioned on one of the walls 52 to selectively engage the door 54 when the door is in the closed position in order to lock the door in the closed position.

A lift assembly 70 forms the floor of the witness box 50. As shown in FIG. 3, the lift assembly 70 includes a lift platform 72 supported by a plurality of lift supports 74 that selectively raise and lower the lift platform 72 to facilitate entry to and egress from the witness box 50 by a physically challenged person. Referring back to FIGS. 1 and 2, the witness box 50 includes an internal control panel 60 and an external control panel 62 so that the lift assembly 70 can be operated from inside or outside of the witness box. The internal and external control panels 60 and 62 also allow an operator to engage and disengage the latch 58 from the door 54 and to operate the drive assembly 100 to open and close the door.

Figure 4:
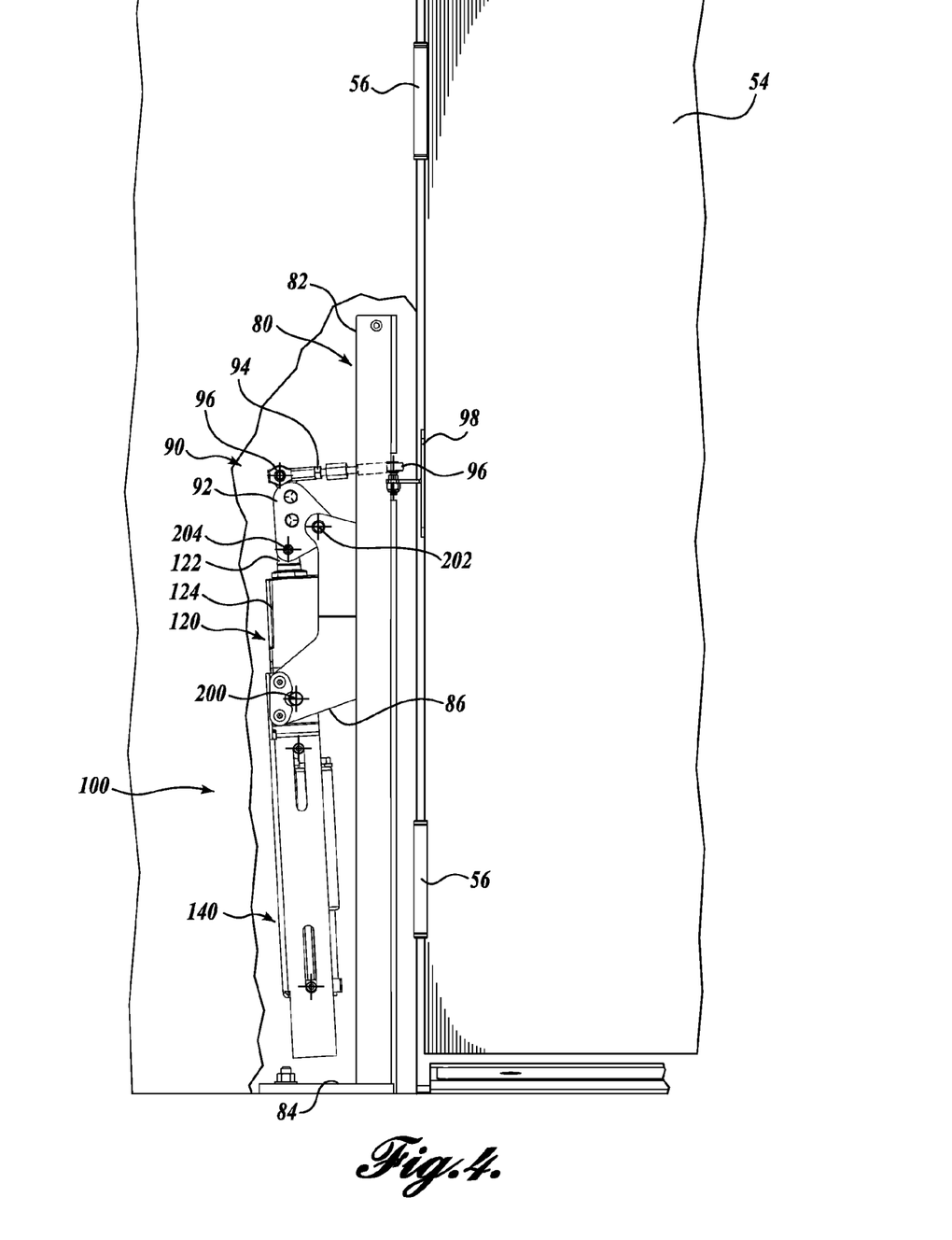
FIG. 4 is a partial cutaway view of the witness box of FIG. 1 showing the drive assembly with the door in a closed position.
Figure 5:
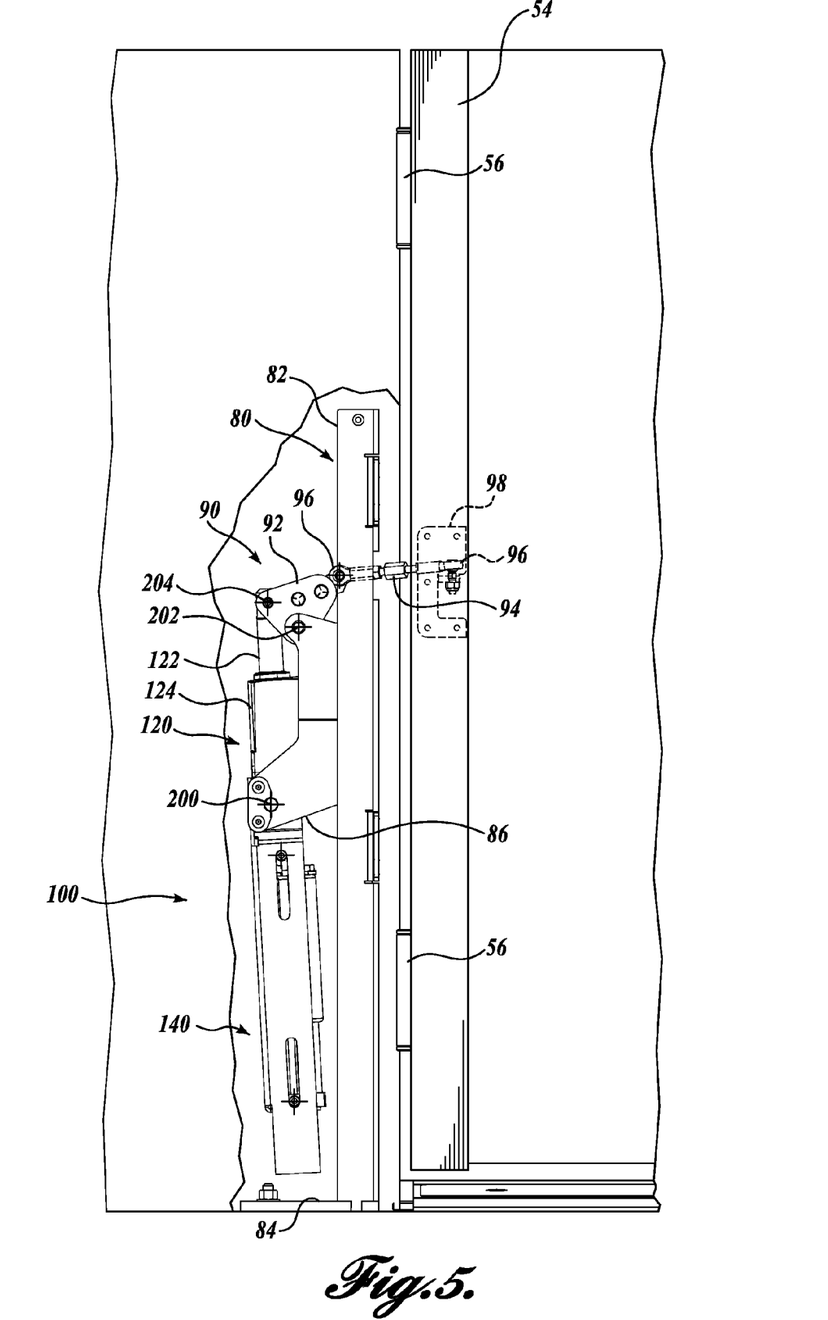
FIG. 5 is a partial cutaway view of the witness box of FIG. 1 showing the drive assembly with the door in an open position.
Figure 6:
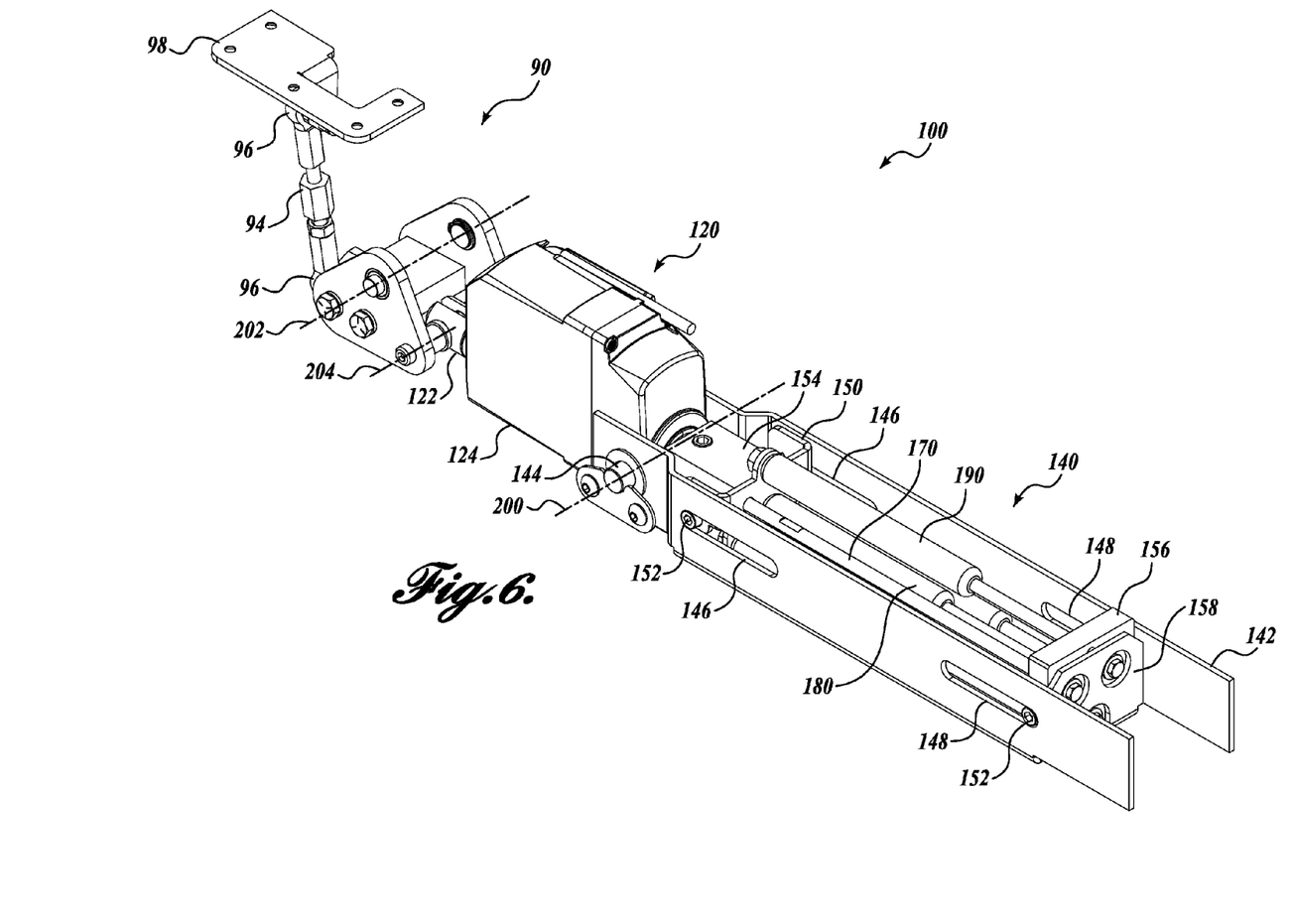
FIG. 6 is an isometric view of the drive assembly of FIG. 1 and a door linkage.

FIGS. 4-6 show an exemplary embodiment of the disclosed drive assembly 100 in which the drive assembly 100 is configured to drive the door 54 between the open and closed positions. The drive assembly 100 is mounted within the wall 52 by a support assembly 80. The support assembly 80 includes a vertical member 82 secured to the floor by a base 84. A support bracket 86 is coupled to the vertical member 82, and as will be described in detail below, the drive assembly is rotatably mounted to the support bracket about an axis 200.

Locating the drive assembly 100 within the wall increases the aesthetic appearance of the witness box 50, and also increases safety, as operators are not exposed to the moving parts of the drive assembly. It will be appreciated, however, that the disclosed placement of the drive assembly 100 within the wall 52 is exemplary only, and that other suitable placements and mounting configurations are possible and should be considered within the scope of the present disclosure.

As will be described in further detail, the disclosed embodiment of the drive assembly 100 includes a linear actuator 120 having a drive rod 122 that selectively extends from and retracts into a housing 124. The linear actuator 120 is coupled to the door 54 by a door linkage 90 so that extension of the drive rod 122 opens the door, and retraction of the drive rod closes the door.

Still referring to FIGS. 4-6, the door linkage 90 includes a bell crank 92 rotatably mounted to the support bracket 86 about an axis 202. The bell crank 92 is also rotatably connected to the drive rod 122 of the linear actuator 120 about axis 204 so that extension and retraction of the drive rod rotates the bell crank about axis 202. A link 94 is pivotally connected at one end to the bell crank 92 by a ball joint 96, and a second end of the link 94 is connected to a door fitting 98 by a ball joint 96. The door fitting 98 is preferably mounted to the side of the door 54, between the hinges 56; however, alternate embodiments in which the door fitting is mounted to the inner or outer face or is otherwise operably coupled to the door are possible.

To open the door 54, the drive rod 122 of the linear actuator 120 extends from the housing 124 to apply a driving force $F_D$ to the bell crank 92. The driving force $F_D$ rotates bell crank 92 about axis 202, which in turn moves the axis 204 of the pinned connection between the drive rod 122 and the bell crank 92 along an arcuate path about the axis 202. As a result, the drive assembly 100 rotates about axis 200. Rotation of the bell crank 92 also pushes link 94 to apply a force to the door fitting 98 that tends to open the door 54. To close the door 54, the drive rod 122 retracts into the housing 124 to apply a driving force $F_D$ in the opposite direction. In this instance, driving force $F_D$ pulls the bell crank 92, thereby rotating the bell crank in the opposite direction about axis 202. The rotation of the bell crank pulls on link 94 to apply a force to the door fitting 98 that tends to close the door 54. This rotation also causes the drive assembly 100 to rotate about axis 200. It should be appreciated that the disclosed door linkage 90 is exemplary only, and that a number of other configurations can be utilized to open and close the door using a linear actuator. Such configurations should be considered within the scope of the present disclosure.

FIG. 6 shows the drive assembly 100 and the door linkage 90. The drive assembly 100 includes the linear actuator 120 and an override assembly 140. The linear actuator 120 is a known linear actuator that selectively applies a driving force $F_D$ in a first direction along the axis of the drive rod 122 as the drive rod extends, and in a second direction along the axis of the drive rod as the drive rod is retracted.

The linear actuator 120 is coupled to the override assembly 140. The override assembly 140 limits the force applied to the door 54 by the drive assembly 100. In the case wherein the door encounters an obstruction, the override assembly 140 prevents injury if the obstruction is a person. For other types of obstructions, the override assembly prevents damage to the door 54 and drive assembly 100 components.

The override assembly 140 includes frame 142 having generally parallel sides spaced apart from each other. At one end of the frame 142, a pin 144 extends outwardly from each side of the frame. The pins 144 engage the support bracket 86 to rotatably mount the frame, and therefore the drive assembly, to the support assembly 80 about axis 200.

Elongate slots 146 are formed in the sides of the frame 142 at a first end of the frame. A C-shaped first spring fitting 150 is disposed between the sides of the frame 142 so that opposing legs of the first spring fitting are each adjacent to one of the sides of the frame. A bearing element 152 is coupled to each of the opposing legs, and each bearing element is disposed within one of the elongate slots 146. Each bearing element 152 is movable along the length of its respective elongate slot 146 so that the first spring fitting 150 is slidably coupled to the frame 142, wherein the slots determine the path and the limits of travel of the first spring fitting relative to the frame.

At a second end of the frame 142, elongate slots 148 are formed in the sides of the frame similar to the first end of the frame. A second spring fitting 156 is positioned between the sides of the frame 142 at the second end of the frame. In the illustrated embodiment, the second spring fitting 156 is a plate that extends across the distance between the sides of the frame 142. The second spring fitting 156 has bearing elements 152 extending laterally from two opposite sides. Each bearing element 152 is disposed within one of the elongate slots 148 so that the second spring fitting 156 is slidably coupled to the frame 142.

The frame 142 includes a cross member 158 that extends between the sides of the frame at the second end of the frame. In the illustrated embodiment, the cross member 158 adds strength to and stiffness to the frame and also acts as an end stop that limits movement of the second spring fitting 156. Thus, movement of the second spring fitting 156 is limited in one direction by the end of the elongate slot 148, and in the second direction by the cross member 158. That is, one end of the elongate slot 148 and the cross member 158 act as end stops to limit the movement of the second spring fitting 156. In contrast, the movement of the first spring fitting 150 is limited by the ends of the elongate slot 146, i.e., the ends of the elongate slots act as end stops. In should be appreciated that the illustrated embodiment is exemplary only, and any number of suitable configurations can be utilized to slidingly mount the first and second spring fittings 150 and 156 without departing from the scope of the present disclosure. Moreover, any number of suitable configurations can be utilized to limit the travel of the first and second spring fittings 150 and 156 relative to the frame, i.e., to act as an end stop, and such alternate embodiments should be considered within the scope of the present disclosure.

Still referring to FIG. 6, a mounting block 154 is coupled to the housing 124 of the linear actuator 120. The mounting block 154 and housing 124 of the linear actuator 120 are at least partially disposed between the sides of the frame 142, with the mounting block being positioned proximate to the first spring fitting 150.

Figure 7:
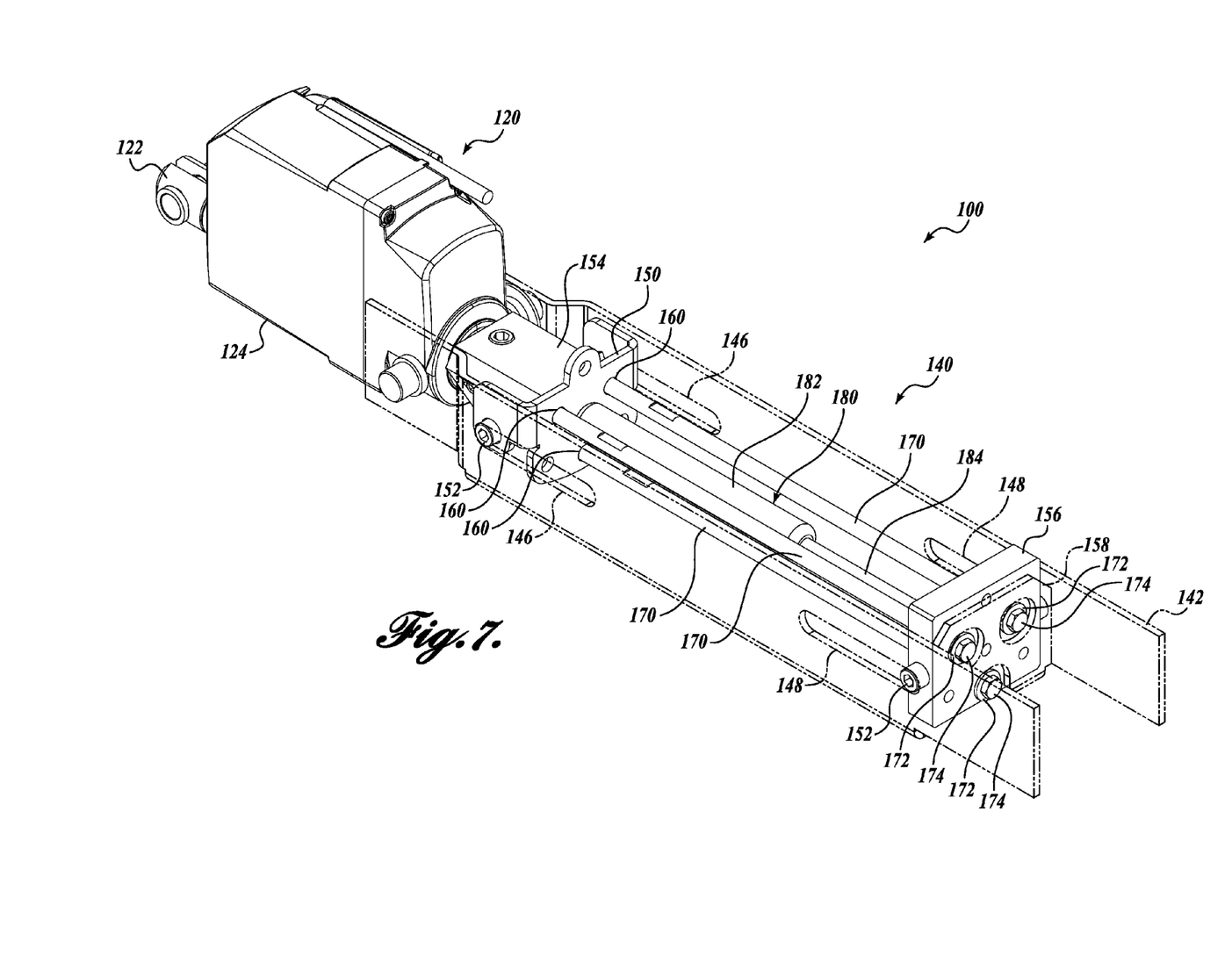
FIG. 7 is an isometric view of the drive assembly of FIG. 6 with the dampers removed.
Figure 8:
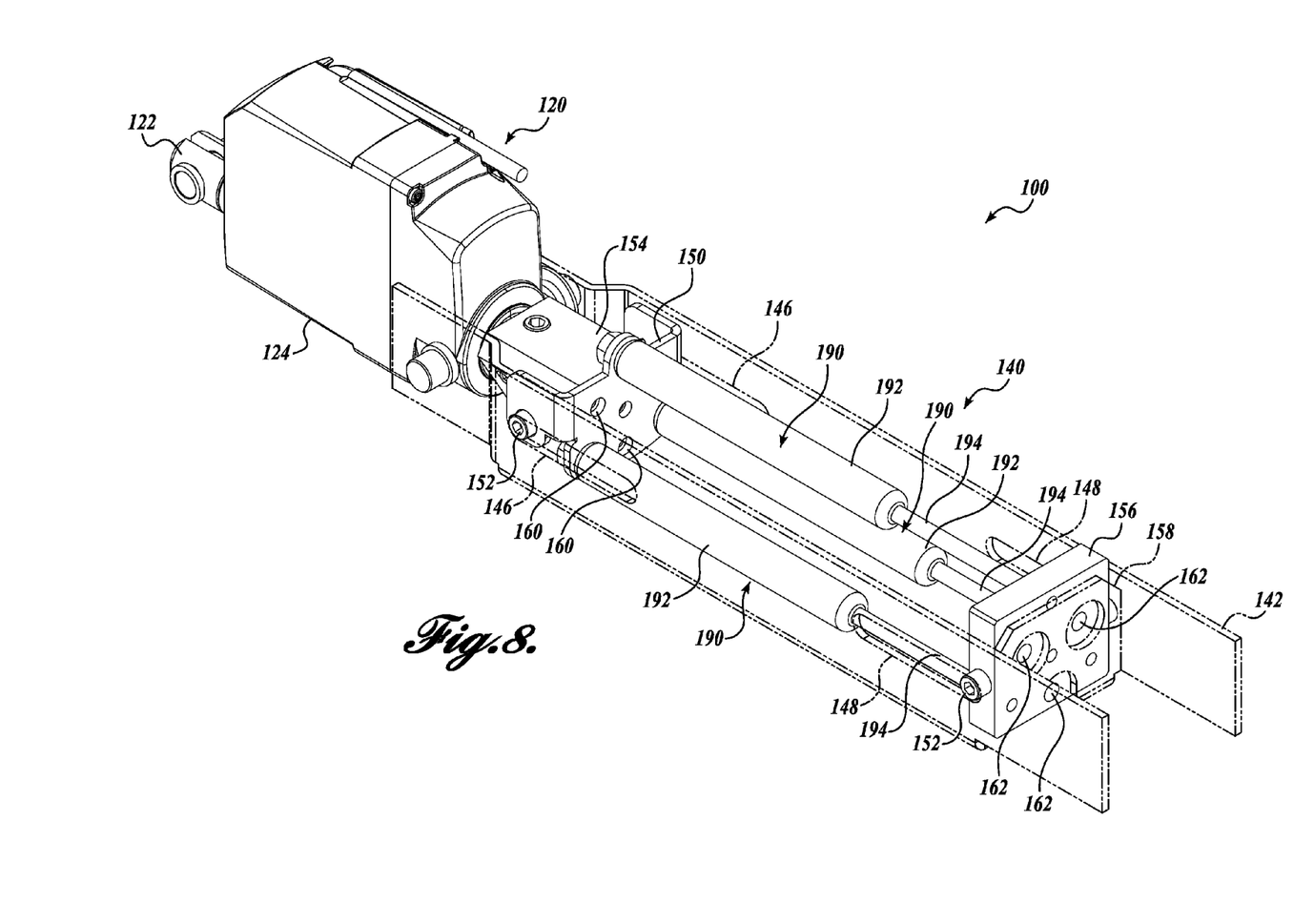
FIG. 8 is an isometric view of the drive assembly of FIG. 6 with the spring and pull rods removed.

Description of the override assembly 140 will proceed with reference to FIGS. 7 and 8. As will be described, the override assembly 140 includes pull rods 170, a spring 180, and a plurality of dampers 190. For the sake of clarity, FIG. 7 shows the override assembly 140 with the dampers 190 removed, and FIG. 8 shows the override assembly with the pull rods 170 and spring 180 removed.

As best shown in FIG. 7, a plurality of pull rods 170 is coupled to the mounting block 154. In the illustrated embodiment, there are three pull rods; however, the number and position of the pull rods can vary. The pull rods 170 are parallel to each other and extend from the mounting block 154 toward the second end of the frame 142. In the illustrated embodiment, each pull rod 170 is threadedly coupled to the mounting block 154 with a pair of flats formed on the pull rod to assist using a wrench to secure the pull rod to the block. Each pull rod 170 extends through a corresponding hole 160 formed in the first spring fitting 150, and through a corresponding hole 162 formed in the second spring fitting 156. (See FIG. 8). A washer 172 is secured to the end of each pull rod 170 by a bolt 174. The washer is larger than the corresponding hole 162 in the second spring fitting 160 so that the washer retains the second spring fitting on the pull rods 170. Thus, the plurality of pull rods 170 have the mounting block 154 secured to one end and the washers 172 secured to the other end. The first and second spring fittings 150 and 156 are slidingly coupled to the pull rods 170 and retained on the pull rods between the mounting block 154 and washers 172.

Referring to FIG. 7, a spring 180 is disposed between the first and second spring fittings 150 and 156, a first end of the spring being secured to the first spring fitting, and a second end of the spring being secured to the second spring fitting. In the illustrated embodiment, the spring 180 is a gas compression spring, that is, the spring 180 has a cylinder 182 and a rod 184, a portion of which is slidably disposed within the cylinder. The spring 180 is preloaded to bias the first and second spring fittings 150 and 156 in opposite directions so that each spring fitting is contacting its corresponding end stop, and the spring fittings are at their maximum distance from each other. Thus, the spring provides a force that resists movement of either spring fitting toward the other spring fitting. The illustrated embodiment shows a single spring, however, it will be appreciated that the number, type, and location of the springs may vary, and such variations should be considered within the scope of the present disclosure.

The spring 180 has a preload so that a force applied to one of the spring fittings must exceed a predetermined minimum force before the spring will begin to compress, i.e., before the rod 184 will retract into the cylinder 182. Accordingly, any force applied to one of the spring fittings 150 and 156 that biases one spring fitting toward the other will not move the spring fitting unless the applied force is greater than the predetermined minimum force.

Referring to FIG. 8, a plurality of dampers 190 are positioned between the first and second spring fittings 150 and 156. Each damper 190 is preferably a linear dashpot (fluid damper) having a cylinder 192 and a rod 194 extending therefrom. For each damper 190, the cylinder 192 is coupled to the first spring fitting 150, and the rod 194 is coupled to the second spring fitting 156. As a result, the dampers 190 apply a damping force to any movement of the first and second spring fittings 150 and 156 relative to each other. The illustrated embodiment uses three dampers 190; however, the number and location of the dampers can vary. Further, the damper can be mechanical dampers, combination mechanical/fluid dampers, magnetic dampers, or any combination of known suitable dampers. It is also contemplated that the drive assembly 100 can use one or more damped springs in lieu of or in conjunction with the spring 180 and dampers 190. In other contemplated embodiments, the drive assembly uses a brake, such as a friction brake, with or in place of fluid dampers in order to limit the return speed of the spring 180 from a compressed state to an uncompressed state. These and other variations are contemplated and should be considered within the scope of the present disclosure.

Figure 9:
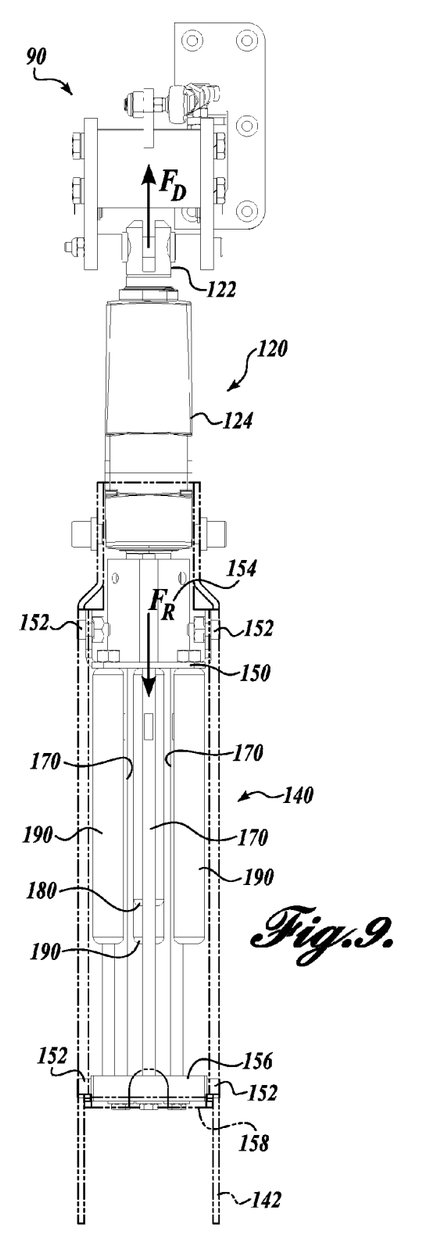
FIG. 9 is a front view of the drive assembly of FIG. 6 with the door in the closed position.
Figure 10:
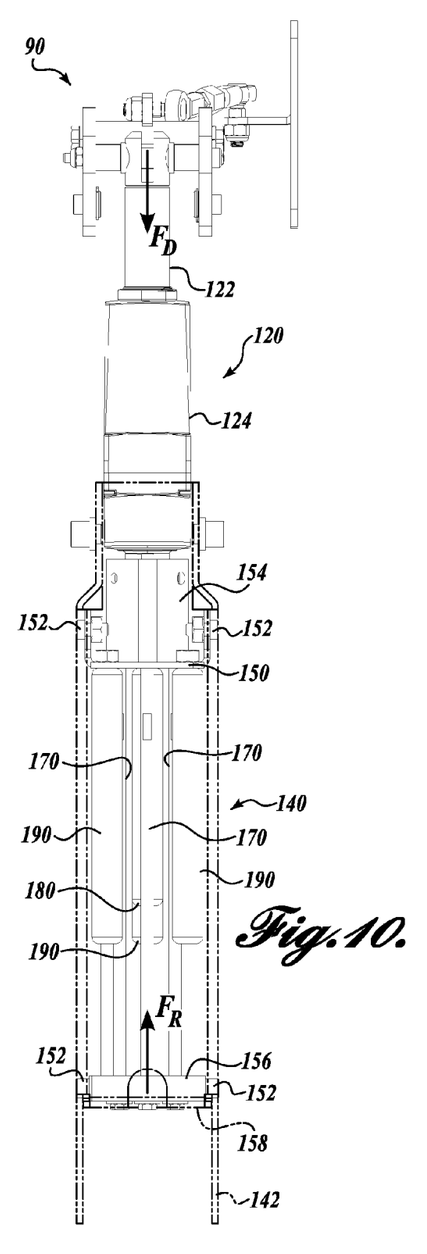
FIG. 10 is a front view of the drive assembly of FIG. 6 with the door in the open position.

Operation of the drive assembly 100 will now be described. FIGS. 9 and 10 show the drive assembly 100 under normal operating conditions. In FIG. 9, the door 54 is in the closed position. To open the door 54, the drive assembly 100 is activated so that the drive rod 122 extends out of the housing 124 of the linear actuator 120 to apply a driving (pushing) force $F_D$ to the door linkage 90. The drive rod 122 extends until it reaches the position in FIG. 10, at which point the door 54 is open. The door 54 and the door linkage 90 provide some passive resistance due to friction, the weight of the door, etc. This resistive force $F_R$ is reacted through the linear actuator 120 and the mounting block 154 to the first spring fitting 150. The mounting block 154 acts as a biasing member, pushing against the first spring fitting 150, which pushes against the spring 180. Under normal operating conditions, the resistive force $F_R$ is less than the preload of the spring 180, so the spring does not compress, and the mounting block 154 does not move. Thus, the housing 124 of the linear actuator 120 remains in a fixed position relative to the frame 142 of the override assembly 140, and the extension of the drive rod 122 opens the door 54.

FIG. 10 shows the door 54 in the open position. To close the door 54, the drive assembly 100 is activated to retract the drive rod 122 into the housing 124 of the linear actuator to apply a driving (pulling) force $F_D$ to the door linkage 90. The drive rod 122 retracts until it reaches the position in FIG. 9, at which point the door 54 is closed. During normal operation, the resistive force $F_R$ is applied to the second spring fitting 156 by the washers 172. The washers 172 act as biasing members, pushing the second spring fitting 156 into the second end of the spring 180. Because the resistive force $F_R$ is less than the preload of the spring 180 during normal operation, the spring does not compress, and the first and second spring fittings 150 and 156 do not move. Accordingly, the housing 124 of the linear actuator 120 remains in a fixed position relative to the frame 142 of the override assembly 140, and the retraction of the drive rod 122 closes the door 54.

Figure 11:
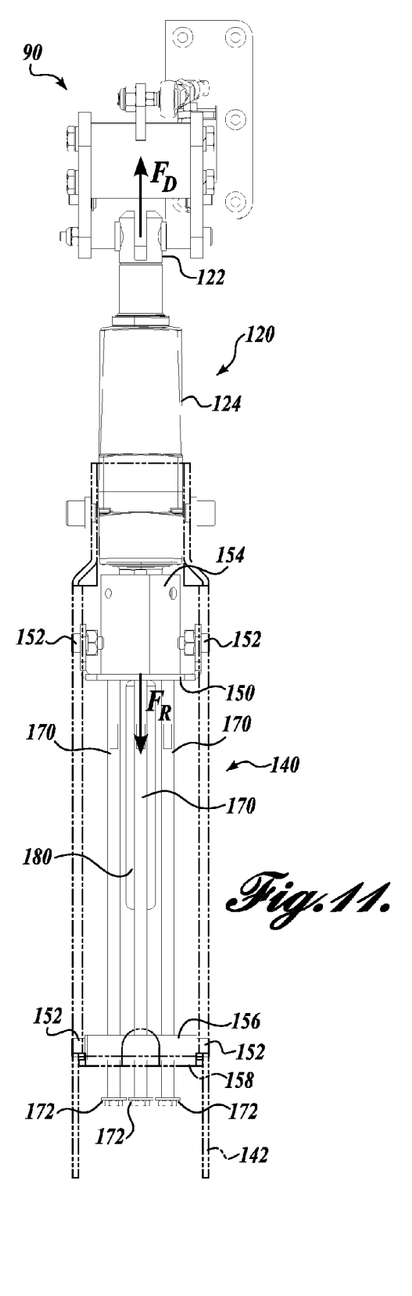
FIG. 11 is a front view of the drive assembly of FIG. 6 in an override condition with the door moving toward the open position and the dampers removed.
Figure 12:
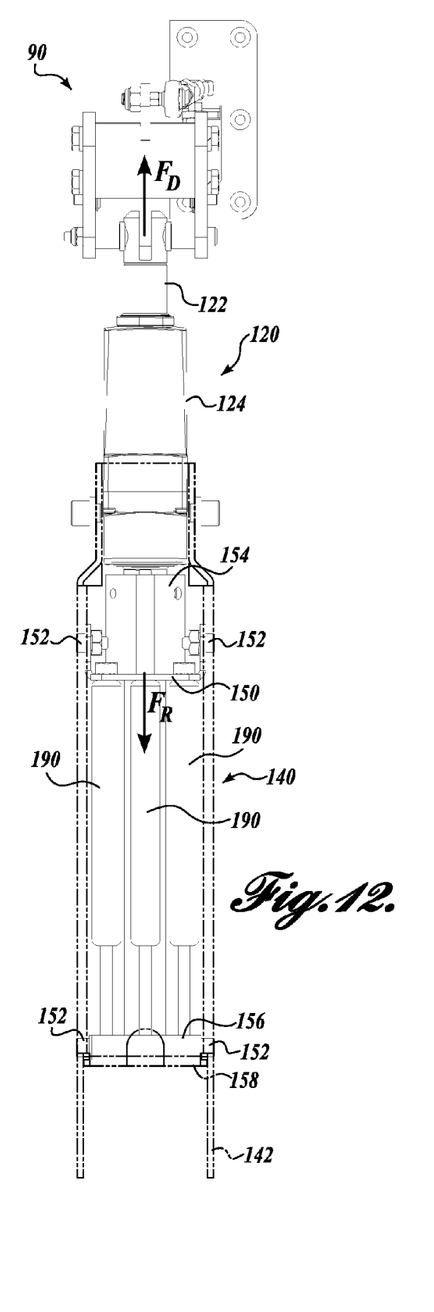
FIG. 12 is a front view of the drive assembly of FIG. 6 in an override condition with the door moving toward the open position and the spring and pull rods removed.

FIGS. 11 and 12 show the drive assembly 100 responding to an override condition while the door 54 moves from the closed position to the open position. For the sake of clarity, FIG. 11 shows the override assembly 140 with the dampers 190 removed, and FIG. 12 shows the override assembly with the pull rods 170 and spring 180 removed.

As discussed with respect to FIG. 9, to open the door 54, the drive rod 122 applies a driving (pushing) force $F_D$ to the door linkage 90, and the resistive force $F_R$ of the door 54, door linkage 90, etc., is reacted into the first spring fitting 150 by the mounting block 154. In the event that the door 54 hit an obstruction while opening, the door stops moving, and the resistive force $F_R$ applied to the first spring fitting 150 increases.

If the resistive force $F_R$ increases beyond the preload of the spring 180, the connection of the drive rod 122 to the door linkage is held in place, and the housing 124 of the linear actuator 120 begins to move instead. Movement of the linear actuator housing 124 toward the override assembly 140 drives the mounting block 154 into the first spring fitting 150. As shown in FIGS. 11 and 12, the first spring fitting 150 moves toward the second spring fitting 156, which remains engaged with the end stop 158, thereby moving the first end of the spring toward the second end of the spring, i.e., compressing the spring. Movement of the first spring fitting 150 toward the second spring fitting 156 also compresses the dampers 190. As the second spring fitting 156 remains positioned against the end stop 158, the pull rods 170, which move with the mounting block 154, move through the holes in the second spring fitting 156 and the end stop 158. As a result, the washers 172 disengage from the second spring fitting 156.

Figure 13:
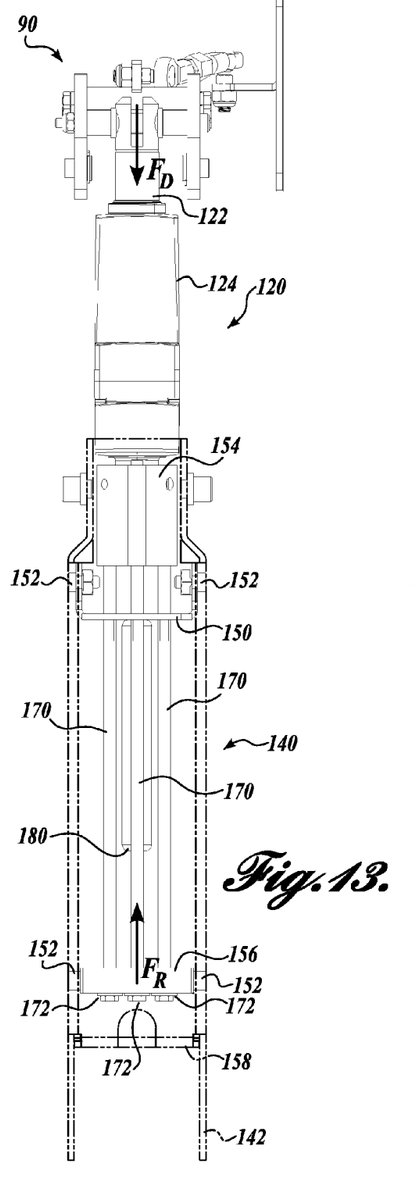
FIG. 13 is a front view of the drive assembly of FIG. 6 in an override condition with the door moving toward the closed position and the dampers removed.
Figure 14:
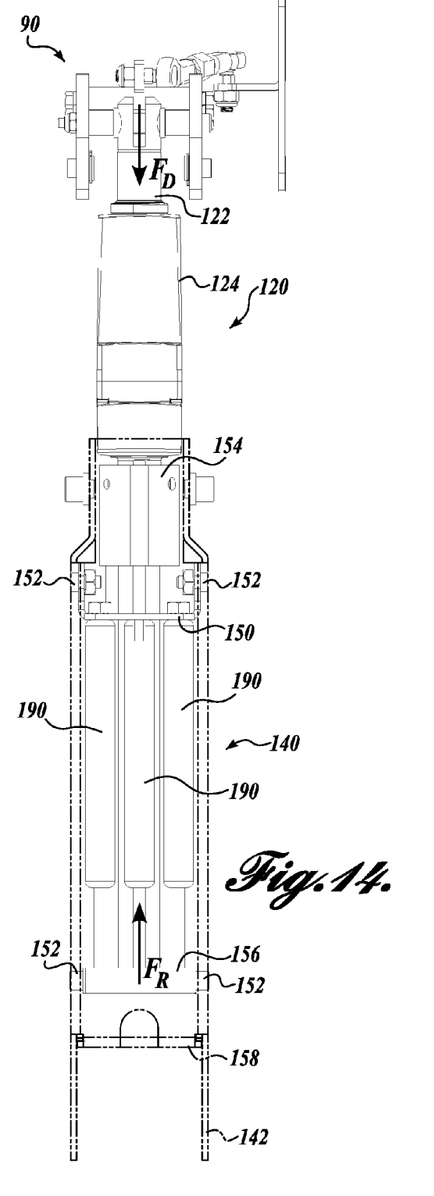
FIG. 14 is a front view of the drive assembly of FIG. 6 in an override condition with the door moving toward the closed position and the spring and pull rods removed.

Referring now to FIGS. 13 and 14, function of the drive assembly 100 during an override condition occurring when the door 54 moves from the open position to the closed position will be described. For the sake of clarity, FIG. 13 shows the override assembly 140 with the dampers 190 removed, and FIG. 14 shows the override assembly with the pull rods 170 and spring 180 removed.

To close the door 54, the drive rod 122 applies a driving (pulling) force $F_D$ to the door linkage 90, and the resistive force $F_R$ of the door 54, door linkage 90, etc., is reacted into the second spring fitting 156 by the washers 172 coupled to the ends of the pull rods 170. In the event that the door 54 hits an obstruction while closing, the door stops moving, and the resistive force $F_R$ applied to the second spring fitting 156 increases.

If the resistive force $F_R$ increases beyond the preload of the spring 180, the connection of the drive rod 122 to the door linkage is held in place, and the housing 124 of the linear actuator 120 begins to move instead. Movement of the linear actuator housing 124 toward the door linkage 90 pulls the washers 172 mounted to the ends of the pull rods 170 into the second spring fitting 156. As the second spring fitting 156 moves toward the first spring fitting 150, which remains engaged with the end stop (end of slot 146), the second end of the spring 180 moves toward the first end of the spring, i.e., the spring is compressed. Movement of the second spring fitting 156 toward the first spring fitting 150 also compresses the dampers 190. As the first spring fitting 150 remains positioned against the end stop, the mounting block 154, which is coupled to the linear actuator 120, moves with the linear actuator to disengage from the first spring fitting 150.

As previously described, the override assembly 140 provides protection to both people in the vicinity of the door, and to the door and drive components themselves. By selecting an appropriate spring 180 preload, the amount of force the door 54 will apply to a person obstructing the door can be kept below a threshold that would cause injury. Further, limiting the force that the door 54 can apply to an obstruction prevents the linear actuator 120 from applying loads to the obstruction, the door, the door linkage 90, or other components that might cause damage.

In addition to limiting the force that the door 54 can apply to an obstruction, the override assembly 140 also allows for manual operation of the door 54. Without the override assembly 140, opening and closing the door 54 manually would require manually extending and retracting the drive rod 122 of the linear actuator 120. Attempting to manually reciprocate the actuator 120 can cause damage or premature wear to the actuator itself, or to other components of the system.

To manually open the door 54, a person applies an opening force to the door itself. Moving the door 54 causes the door linkage 90 to apply a force to the drive rod 122 that tends to pull the drive rod out of the housing 124, i.e., it tends to force the drive rod to extend. The linear actuator 120 resists movement of the drive rod 122 relative to the housing 124, and as a result, the force applied to the drive rod by the door linkage 90 is transferred from the housing, through the pull rods 170 to the second spring fitting 156. When the force applied to the second spring fitting 156 exceeds the preload of the spring 180, the second spring fitting moves toward the first spring fitting 150, thereby compressing the spring.

When the door 54 has been opened manually, the spring 180 has been compressed. As a result, the spring 180 applies a force to the door linkage 90 (through the second spring fitting 156, mounting block 154, and linear actuator 120) that tends to close the door. Therefore, when the door 54 is released, it swings back to the closed position. The dampers 190, which have also been compressed between the first and second spring fittings 150 and 156, limit the speed at which the door 54 moves. This not only prevents potential injury caused by the door swinging back too fast, but also prevents potential damage to the door and surrounding millwork from the door slamming shut. Similarly, when the door is manually closed from an open position and then released, the dampers 190 limit the speed at which the door returns to the open position.

It will be appreciated that while the disclosed drive assembly is illustrated in conjunction with the door of a courtroom witness box, the drive assembly is suitable for use in a number of other configurations. For example, various embodiments of the drive assembly can be used in ramps, lifts, and any other mechanisms that can be moved by applying a driving force to an actuatable component thereof. Accordingly, the present disclosure is not limited to any particular use of the described drive assembly.

While the preferred embodiment of the disclosed subject matter has been illustrated and described, it will be appreciated that various changes can be made therein without departing from the spirit and scope of the disclosure.

The embodiments of the invention in which an exclusive property or privilege is claimed are defined as follows:

1. A drive assembly for driving an actuatable component in a first direction and a second direction, the drive assembly comprising:
    a support,
    an override assembly comprising
        a frame rotatably coupled to the support,
        first and second spring fittings slidably coupled to the frame,
        a spring disposed between the first and second spring fittings,
        a rod slidably associated with the first and second spring fittings,
        first and second biasing members associated with the rod, the first and second spring fittings being disposed between the first and second biasing members;
    an actuator, comprising
        a housing fixedly coupled to the first biasing member; and
        a drive rod selectively extending from and retracting into the housing to apply a driving force to the actuatable component in the first direction and the second direction, respectively, application of the driving force creating a reactive force on the housing.

2. The drive assembly of claim 1, wherein the spring biases the first spring fitting toward the first biasing member, and the spring biases the second spring fitting toward the second biasing member.

3. The drive assembly of claim 2, further comprising a damper coupled at a first end to the first spring fitting and coupled at a second end to the second spring fitting.

4. The drive assembly of claim 2, further comprising a first end stop and a second end stop, the first spring fitting engaging the first end stop, the second spring fitting engaging the second end stop.

5. The drive assembly of claim 4, the first spring fitting disengaging the first end stop when the reactive force exceeds the predetermined limit and the drive rod applies the driving force in the first direction.

6. The drive assembly of claim 5, the second spring fitting disengaging the second end stop when the reactive force exceeds the predetermined limit and the drive rod applies the driving force in the second direction.

7. The drive assembly of claim 2, wherein the first biasing member engages the first spring fitting, and the second biasing member engages the second spring fitting.

8. The drive assembly of claim 7, the second biasing member disengaging the second spring fitting when the reactive force exceeds the predetermined limit and the drive rod applies the driving force in the first direction.

9. The drive assembly of claim 8, the first biasing member disengaging the first spring fitting when the reactive force exceeds the predetermined limit and the drive rod applies the driving force in the second direction.

10. A drive assembly for selectively opening and closing a door, the drive assembly comprising:
   an actuator comprising a housing and a drive rod, the drive rod applying a driving force in a first direction to open the door and in a second direction to close the door, application of the driving force creating a reactive force on the actuator; and
   an override assembly coupled to the actuator, comprising
      a frame;
      a first spring fitting slidably coupled to the frame;
      a second spring fitting slidably coupled to the frame; and
      a spring disposed between the first spring fitting and the second spring fitting;
   wherein the first spring fitting moves relative to the frame and toward the second spring fitting when the reactive force exceeds a predetermined limit and the actuator is applying the driving force in the first direction; and
   wherein the second spring fitting moves relative to the frame and toward the first spring fitting when the reactive force exceeds the predetermined limit and the actuator is applying the driving force in the second direction.

11. The drive assembly of claim 10, further comprising a door linkage coupled to the actuator and to the door, the door linkage opening the door in response to the driving force in the first direction, the door linkage closing the door in response to the driving force in the second direction.

12. The drive assembly of claim 10, wherein a first end of the spring is coupled to the first spring fitting, and a second end of the spring is coupled to the second spring fitting.

13. The drive assembly of claim 12, wherein the first spring fitting moves the first end of the spring toward the second end of the spring when the reactive force exceeds the predetermined limit and the actuator is applying the driving force in the first direction.

14. The drive assembly of claim 13, wherein the second spring fitting moves the second end of the spring toward the first end of the spring when the reactive force exceeds the predetermined limit and the actuator is applying the driving force in the second direction.

15. The drive assembly of claim 10, further comprising a damper, a first end of the damper being coupled to the first spring fitting, and a second end of the damper being coupled to the second spring fitting.

16. The drive assembly of claim 10, wherein the housing moves toward the second spring fitting when the reactive force exceeds the predetermined limit and the actuator is applying the driving force in the first direction.

17. The drive assembly of claim 16, wherein the housing moves away from the first spring fitting when the reactive force exceeds the predetermined limit and the actuator is applying the driving force in the second direction.

18. The drive assembly of claim 10, further comprising a first end stop and a second end stop, the first spring fitting engaging the first end stop, the second spring fitting engaging the second end stop.

19. The drive assembly of claim 18, the first spring fitting disengaging the first end stop when the reactive force exceeds the predetermined limit and the drive rod applies the driving force in the first direction.

20. The drive assembly of claim 19, the second spring fitting disengaging the second end stop when the reactive force exceeds the predetermined limit and the drive rod applies the driving force in the second direction.

* * * * *